J. Oaster,
Washing Machine,
N° 39,307.  Patented July 21, 1863.

Witnesses
Julius Hirsch
Randolph Coyle Jr.

Inventor
Joseph Oaster
by his attorneys Gifford & Cohen

UNITED STATES PATENT OFFICE.

JOSEPH OASTER, OF AMBOY, ILLINOIS.

IMPROVED WASHING-MACHINE.

Specification forming part of Letters Patent No. 39,307, dated July 21, 1863.

*To all whom it may concern:*

Be it known that I, JOSEPH OASTER, of Amboy, in the county of Lee and State of Illinois, have invented certain new and useful Improvements in Washing-Machines; and I do hereby declare that the following is a full, clear, and exact description of the construction and operation of the same, reference being had to the accompanying drawings, in which—

Figure 1:
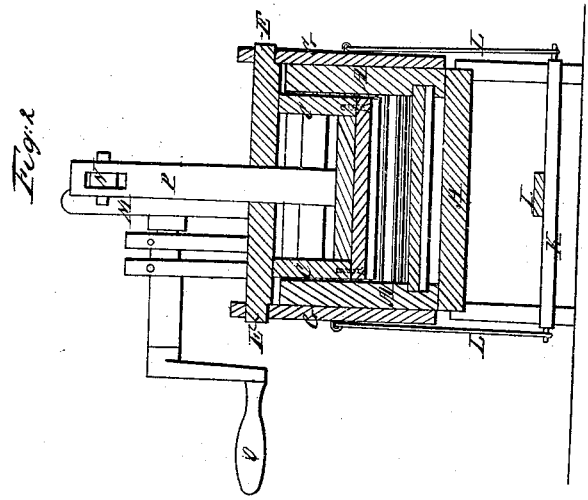
Figure 2:
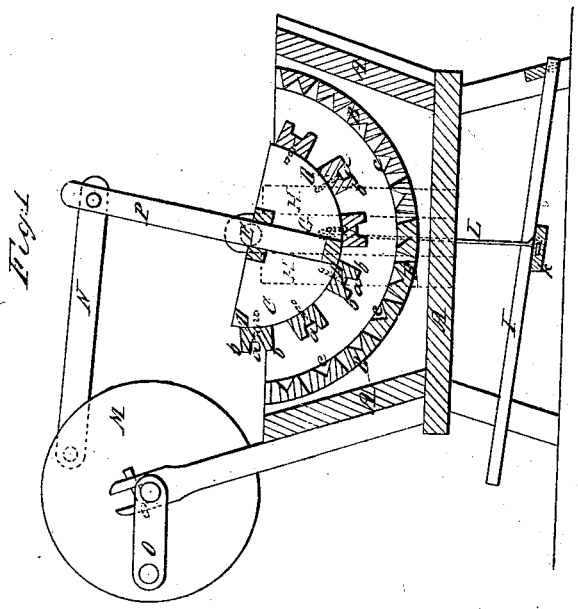

Figure 1 represents a longitudinal vertical section through said washing-machine. Fig. 2 represents a vertical cross-section through the same.

To enable others skilled in the art to make and use my invention, I will proceed to describe its construction and operation.

A represents the wash-box.

B represents the concave. It is composed of ribs or slats B, the ends of which extend into circular grooves c in each of the sides of the wash-box, the slats fitting tightly therein, so as to remain in their positions when inserted. By this arrangement I am enabled not only to adjust the spaces between the slats, for the purpose of regulating the flow of the soap-suds from the wash-box through the concave, but also to remove the slats, should it become necessary to repair them or for cleaning the wash-box.

C represents the cylindrical rubber. It has slats D secured to its circumference, which operate on the clothes on the concave B. The journals E of the rubber have their bearings within the slides G, which can play freely within their vertical guides H, and which thus cause the rubber to rest by its own weight on the clothes as they lie on the concave B. The rubber C may also be pressed down on the clothes, if necessary, by means of the treadle I and cross-piece K, to which the slides G are connected by means of the rods L. The rubber C is oscillated by the crank-wheel M and connecting rod N, which is attached to the rubber-shaft P, the machine being operated by the crank O; but instead of using the crank-wheel M, the connecting-rod N may be attached to a crank. The slats D of the rubber have grooves a running through their entire length, leaving on each edge projections b, which, when the rubber is oscillated, catch the clothes and lift or turn them at each operation, thus bringing all parts of them under the action of the rubber.

From this description of the machine it will be seen that the rubber is always in contact with the clothes by its own weight; that the proper working of the machine is not affected by the higher or lower position of the rubber or the quantity of clothes to be operated upon; that the force with which the rubber acts upon the clothes may be increased according to the material of the clothes; that the latter while they undergo the operation are not only rubbed, but also constantly turned; that the position of the slats of the concave may be adjusted to adjust the space between said slats, for the purpose of regulating the flow of the soap-suds from the wash-box between said slats and through the clothes, which is of great importance in washing large pieces of heavy cloth, and that said slats may be removed, if repairs should become necessary.

Having thus fully described the nature of my invention, what I claim herein as new, and desire to secure by Letters Patent, is—

In combination with the self-adjusting cylindrical rubber C, herein described, the removable and adjustable slats B of the concave, substantially in the manner and for the purpose set forth.

JOSEPH OASTER.

Witnesses:
JOHN MICKLER,
SIMON BADGER.